United States Patent
Moran

(10) Patent No.: US 10,337,776 B2
(45) Date of Patent: Jul. 2, 2019

(54) REFRIGERATION SYSTEM HAVING VALVES AND VALVE CONTROL ACTUATORS

(71) Applicant: THE BOEING COMPANY, Chicago, IL (US)

(72) Inventor: Thomas Joseph Moran, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 15/708,344

(22) Filed: Sep. 19, 2017

(65) Prior Publication Data

US 2019/0086129 A1    Mar. 21, 2019

(51) Int. Cl.
| | |
|---|---|
| *F25B 41/04* | (2006.01) |
| *B64D 13/08* | (2006.01) |
| *B64D 11/00* | (2006.01) |
| *B64D 11/04* | (2006.01) |
| *B64D 13/06* | (2006.01) |

(52) U.S. Cl.
CPC .......... *F25B 41/04* (2013.01); *B64D 11/0007* (2013.01); *B64D 11/04* (2013.01); *B64D 13/08* (2013.01); *B64D 2013/0629* (2013.01); *F25B 2600/2515* (2013.01); *F25D 2400/20* (2013.01)

(58) Field of Classification Search
CPC ............. F25B 41/04; F25B 2600/2515; B64D 11/0007; B64D 11/04; B64D 13/08; B64D 2015/0629; F25D 2400/20
See application file for complete search history.

(56) References Cited

U.S. PATENT DOCUMENTS

| | | |
|---|---|---|
| 4,361,014 A | 11/1982 | Blain |
| 6,845,627 B1 | 1/2005 | Buck |

(Continued)

FOREIGN PATENT DOCUMENTS

| | | |
|---|---|---|
| DE | 102005049688 A1 | 4/2007 |
| EP | 2251260 A2 | 11/2010 |

(Continued)

OTHER PUBLICATIONS

Extended European Search Report for Corresponding EP Application No. 14183463, dated Jan. 30, 2015; 8 pages.

*Primary Examiner* — Marc E Norman
(74) *Attorney, Agent, or Firm* — Jay J. Hoette; The Small Patent Law Group, LLC

(57) ABSTRACT

A refrigeration system having an airflow supply system having a supply duct providing cooled air from a refrigeration unit to a plurality of galley carts received in one or more cart compartments includes a plurality of valves coupled in the airflow supply system for controlling flows of the cooled air to the plurality of galley carts in the one or more cart compartments, where each valve of the plurality of valves is associated with a respective galley cart. The refrigeration system includes a plurality of primary valve control actuators each coupled to a respective valve and configured to reposition the respective valve during a first mode of operation. The refrigeration system includes a backup valve control actuator coupled to at least one of the plurality of valves and configured to reposition the at least one of the plurality of valves during a second mode of operation.

22 Claims, 3 Drawing Sheets

(56) References Cited

U.S. PATENT DOCUMENTS

| | | |
|---|---|---|
| 6,975,958 B2 | 12/2005 | Bohrer et al. |
| 7,024,874 B2 | 4/2006 | Zywiak et al. |
| 7,231,778 B2 | 6/2007 | Oswald |
| 7,721,564 B2 | 5/2010 | Rizzo |
| 8,151,582 B2 | 4/2012 | Simadiris et al. |
| 2003/0042361 A1 | 3/2003 | Simadiris |
| 2005/0193760 A1 | 9/2005 | Moran et al. |
| 2008/0155993 A1 | 7/2008 | Kuehl |
| 2010/0029190 A1 | 2/2010 | Dessero et al. |
| 2010/0050665 A1 | 3/2010 | Oswald et al. |
| 2012/0130679 A1 | 5/2012 | Fadell et al. |
| 2013/0047657 A1 | 2/2013 | Oswald et al. |
| 2013/0099011 A1 | 4/2013 | Matsuoka et al. |
| 2015/0059385 A1 | 3/2015 | Burd |
| 2015/0065024 A1 | 3/2015 | Moran et al. |
| 2015/0212191 A1 | 7/2015 | Zhang et al. |
| 2016/0114892 A1 | 4/2016 | Moran |
| 2016/0340046 A1 | 11/2016 | Moran |
| 2017/0122647 A1* | 5/2017 | Burd ................. B64D 11/04 |

FOREIGN PATENT DOCUMENTS

| | | |
|---|---|---|
| GB | 2095387 A | 9/1982 |
| JE | 19952523 A1 | 5/2001 |
| WO | 2012112356 A2 | 8/2012 |

* cited by examiner

REFRIGERATION SYSTEM HAVING VALVES AND VALVE CONTROL ACTUATORS

BACKGROUND

The present disclosure relates generally to refrigeration systems for galleys of aircraft and, more particularly, to valve control systems for refrigeration systems.

Airline meals are typically prepared in advance by caterers. In one approach, a caterer prepares a large quantity of individual meals and stores the meals in a refrigeration locker. In preparation for a flight, the caterer takes the required quantity of meals out of the locker and places the meals in aircraft galley carts. The caterer then transports the galley carts to the aircraft and loads the meals into a galley. The galley typically includes a plurality of refrigerated compartments or zones. Accordingly, one or more galley carts may be loaded into a single compartment.

In operation, conventional galleys typically includes a single refrigeration unit that supplies cooled air to each of the compartments or zones via a plurality of ducts. Proposals have been made for galleys to include valves and a valve control system for controlling airflow to individual galley carts to direct specific airflow to needed galley carts at any time. For example, valve control systems have been proposed that allow closing off airflow to empty galley carts or to direct higher airflow to galley carts that need to be cooled quickly, such as galley carts that recently arrived on the aircraft. The valve control system adds complexity to the refrigeration system Moreover, if the valve control for one of the valves faults or fails such that the refrigeration system is unable to cool one of the galley carts, such failure can lead to flight departure delays or cancelled flights to repair the valve control.

SUMMARY

In accordance with one embodiment, a refrigeration system is provided having an airflow supply system having a supply duct providing cooled air from a refrigeration unit to a plurality of galley carts received in one or more cart compartments. The refrigeration system includes a plurality of valves coupled in the airflow supply system for controlling flows of the cooled air to the plurality of galley carts in the one or more cart compartments, where each valve of the plurality of valves is associated with a respective galley cart. The refrigeration system includes a plurality of primary valve control actuators each coupled to a respective valve and configured to reposition the respective valve during a first mode of operation. The refrigeration system includes a backup valve control actuator coupled to at least one of the plurality of valves and configured to reposition the at least one of the plurality of valves during a second mode of operation.

In accordance with another embodiment, a refrigeration system is provided having an airflow supply system having a supply duct providing cooled air from a refrigeration unit to a plurality of galley carts received in one or more cart compartments. The refrigeration system includes a plurality of valves coupled in the airflow supply system for controlling flows of the cooled air to the plurality of galley carts in the one or more cart compartments. Each valve of the plurality of valves is associated with a respective galley cart. The refrigeration system includes a first single valve control actuator coupled to a single respective valve and configured to reposition the respective valve during a first mode of operation and configured to be nonoperational on the respective valve during a second mode of operation. The refrigeration system includes a second single valve control actuator coupled to a single respective valve different from the valve associated with the first single valve control actuator and configured to reposition the respective valve during the second mode of operation and configured to be nonoperational on the respective valve during the first mode of operation. The refrigeration system includes a first multiple valve control actuator coupled to at least two of the plurality of valves. The first multiple valve control actuator repositions a first valve of the at least two of the plurality of valves during the first mode of operation and repositions a second valve of the at least two of the plurality of valves during the second mode of operation.

In accordance with another embodiment, a refrigeration system is provided having an airflow supply system having a supply duct providing cooled air from a refrigeration unit to a plurality of galley carts received in one or more cart compartments. The refrigeration system includes a first valve coupled in the airflow supply system for controlling flow of the cooled air to a first galley cart of the plurality of galley carts and a second valve coupled in the airflow supply system for controlling flow of the cooled air to a second galley cart of the plurality of galley carts. The refrigeration system includes a valve control system for controlling positions of the first valve and the second valve. The valve control system is operable in a first mode of operation and a second mode of operation. The valve control system includes a first valve control actuator operably coupled to the valve control system being coupled to the first valve and configured to reposition the first valve in the first mode of operation. The valve control system includes a second valve control actuator operably coupled to the valve control system being coupled to the second valve and configured to reposition the second valve in the first mode of operation and being coupled to the first valve and configured to reposition the first valve in the second mode of operation. The valve control system includes a third valve control actuator operably coupled to the valve control system and being coupled to the second valve and configured to reposition the second valve in the second mode of operation.

The features and functions that have been discussed can be achieved independently in various embodiments or may be combined in yet other embodiments, further details of which can be seen with reference to the following description and drawings.

DETAILED DESCRIPTION

Figure 1:
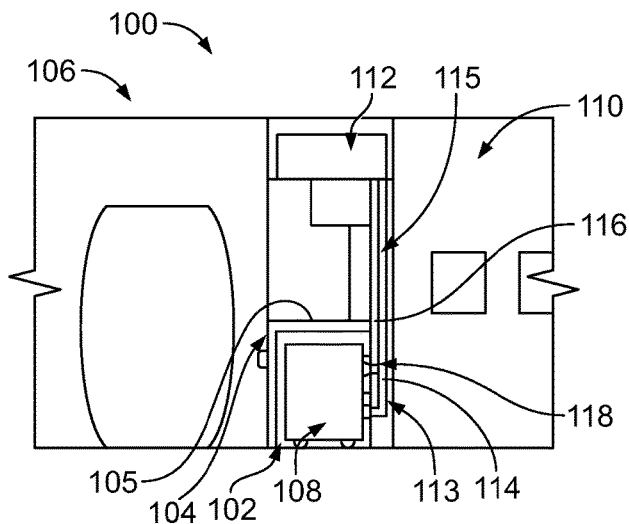
FIG. 1 is a schematic illustration of an exemplary cooling system for a galley monument of an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a refrigeration system for an aircraft configured to supply cooling air to galley carts in one or more cart compartments. For example, the refrigeration system includes a least one cooling air supply duct with a valve to control flow of the cooled air to the respective galley cart. In various embodiments, a valve control system is provided for controlling positions of the valves to control the airflow. The valve control system is operable in different modes to ensure that the valves do not fail, thus ensuring that the galley carts are able to receive the cooled airflow even when one of the valve control actuators fails or faults.

FIG. 1 is a schematic illustration of an exemplary refrigeration system 100 for an aircraft 106. The refrigeration system 100 is used to cool galley carts 108 held in cart compartments 102 of a galley 104. The galley 104 defines one or more cart compartments 102, which are typically arranged below a counter 105 of the galley 104. The galley 104 is positioned within a cabin 110 of the aircraft 106. The galley 104 has a working area for the galley crew where the cart compartments 102, counter 105 and cabinets or storage bins may be accessed.

As used herein a cart compartment is an insulated volume that is utilized to store one or more galley carts on the aircraft 106. A galley cart, as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108. The galleys 104 may be used for the storage and/or preparation of food or beverages.

The refrigeration system 100 includes a refrigeration unit 112 that provides cooled air for the galley carts 108 in the cart compartment 102. The refrigeration unit 112 may include an evaporator, a condenser, a compressor, and an expansion valve (not shown); however, other types of refrigeration units may be used in alternative embodiments. In operation, a refrigerant, not shown, is compressed via the compressor. The compressed refrigerant is transmitted from compressor as a vapor at a higher temperature. The vapor is channeled through the condenser which condenses the vapor into a liquid by removing the heat acquired from the return air from the cart compartments 102 and/or the galley carts 108 by the evaporator. The condensed vapor is then channeled through the expansion valve and back to the compressor. Thus, the refrigeration unit 112 is configured to remove heat from the cart compartments 102 and/or the galley carts 108 thereby cooling or reducing the temperature of the cart compartments 102 and/or the galley carts 108. It should be realized that different type of refrigeration units may be used to cool the cart compartments 102 and/or the galley carts 108. The refrigeration unit 112 may be positioned in or near the galley 104, such as at the top of the galley 104 in the crown of the aircraft 106.

The refrigeration system 100 includes an airflow return system 113 having one or more return ducts 114 and an airflow supply system 115 having one or more supply ducts 116. The airflow supply system 115 is configured to channel the cooled air supplied by the refrigeration unit 112 through supply ducts 116 to the galley carts 108 in the cart compartments 102. The airflow return system 113 is configured to return heated or exhausted air from the cart compartments 102 to the refrigeration unit 112 through a return ducts 114. In an exemplary embodiment, the supply ducts 116 are routed in the galley 104 to the cart compartment(s) 102 to one or more discharge locations, such as above, behind or hear corresponding galley carts 108. In an exemplary embodiment, each cart compartment 102 includes a single supply duct 116 and a single return duct 114. However, it should be realized that each cart compartment 102 may include more than one air supply duct 116 and/or more than one air return duct 114. In various embodiments, the supply duct 116 discharges the cool air into the cart compartment 102 for an air-over-cart supply arrangement. In other various embodiments, the supply duct 116 discharges the cool air directly into the corresponding galley cart 108, such as into a vent, for an air-through-cart supply arrangement.

In an exemplary embodiment, the refrigeration system 100 includes a valve control system 118 having a plurality of valves and a plurality of actuators for controlling the valves to control the airflow through the supply ducts 116. For example, each supply duct 116 may include a valve for controlling airflow through such supply duct 116. Optionally, the supply duct may have multiple supply ports that open to different cart compartments 102 and/or galley carts 108. Each supply port may include a corresponding valve to control airflow through such supply port. The valves may be opened, partially opened, partially closed and/or closed by the corresponding actuators to control the airflow to the galley carts 108. The valves may be operable in any operational position between fully open and fully closed. The valve control system 118 may independently control the actuators to individually control the valves and thus supply cooled airflow to the galley carts 108 at different flow rates or on-demand. In an exemplary embodiment, the valves may be partially opened or closed for throttling an amount of cool air flowing through the supply duct 116. The valve may be any type of valve that is capable of regulating airflow through a system, such as a butterfly valve, a shutter valve, a ball valve, a choke valve, a diaphragm valve, a gate valve, a globe valve, and the like configured to control an amount of cool air flowing through the supply duct 116. In an exemplary embodiment, the valve control system 118 electrically controls the actuators to control the flow of cool air, which may be controlled by a controller that is described in more detail below. For example, the actuators may be solenoids to control positioning of the respective valves. In an exemplary embodiment, the valve control system 118 includes a fail-safe measure to ensure that the valves do not fail closed and/or to ensure that the actuators do not fail holding the valves closed.

Figure 2:
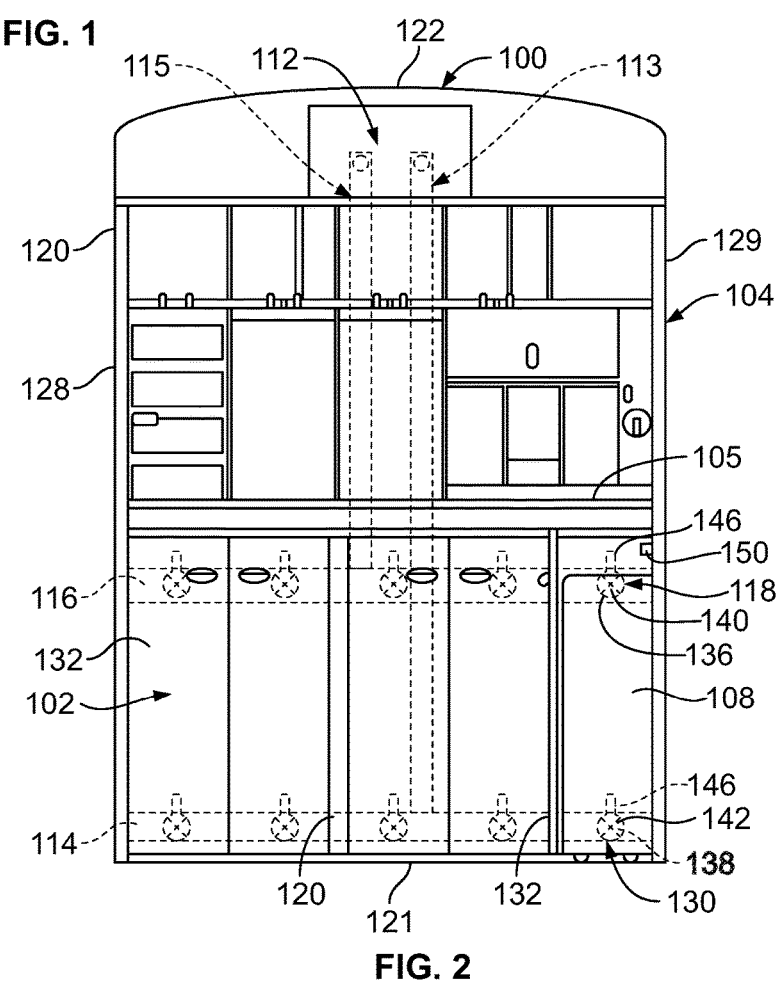
FIG. 2 is a side view of the galley in accordance with an exemplary embodiment.
Figure 3:
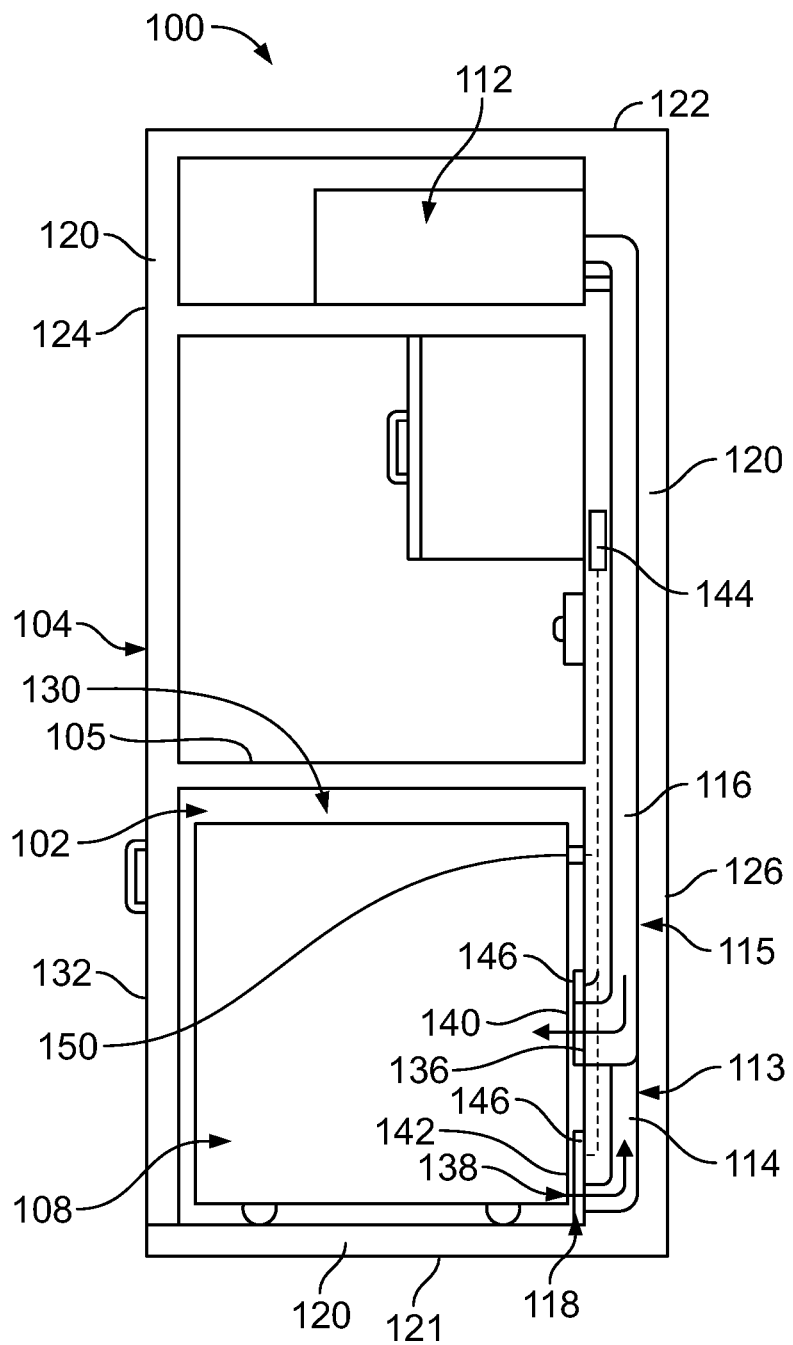
FIG. 3 is a front view of the galley in accordance with an exemplary embodiment.

FIG. 2 is a side view of the galley 104 in accordance with an exemplary embodiment. FIG. 3 is a front view of the galley 104 in accordance with an exemplary embodiment. The galley 104 includes walls 120 or partitions defining a bottom 121, a top 122, a front 124, a rear 126 opposite the front 124, and opposite sides 128, 129 (which may also be referred to as bottom wall 121, top wall 122, front wall 124, rear wall 126 and side walls 128, 129). In the illustrated embodiment, the counter 105 extends between the sides 128, 129 at a height approximately centered between the bottom 121 and the top 122. The bottom 121 may be defined by a floor of the cabin of the aircraft. The rear 126 may be forward facing or rearward facing, depending on the orientation of the galley 104 within the cabin. The rear 126 may face the passenger area (e.g., passenger seats may be located behind the rear 126, in front of the rear 126, and the like); however in alternative embodiments, the rear 126 may be positioned against a bulkhead.

The cart compartment 102 is positioned below the counter 105 and may be at least partially defined by the walls 120 of the galley 104. The cart compartment 102 defines a cavity 130 configured to receive the corresponding galley cart(s) 108. In an exemplary embodiment, the galley 104 includes doors 132 (the door on the right is shown open, the other doors are shown closed) at the front 124 that close the cart compartment(s) 102. The doors 132 are used to hold the galley carts 108 in the cart compartment 102. The doors 132 may be used to hold the cooled air in the cart compartment 102. The doors 132 may provide thermal insulation. In an exemplary embodiment, when the galley carts 108 are positioned in the cavity 130, a space is defined about the galley cart 108, such as in front of the galley carts 108, behind the galley carts 108, above the galley carts 108, and the like. Optionally, air may be able to flow around the galley carts 108 in the space.

The airflow supply system 115 includes the supply ducts 116 between the refrigeration unit 112 and the galley carts 108 in the cart compartment(s) 102. In the illustrated embodiment, the supply ducts 116 are routed along the rear 126 of the galley 104. The supply ducts 116 include supply ports 136 through which the cooled air is expelled from the supply ducts 116, such as into the cart compartment 102 or directly into the galley cart 108. The airflow return system 113 includes the return ducts 114 between the refrigeration unit 112 and the galley carts 108 in the cart compartment(s) 102. In the illustrated embodiment, the return ducts 114 are routed along the rear 126 of the galley 104. The return ducts 114 include return ports 138 through which the cooled air is received from the cart compartment 102 or directly from the galley cart 108 and returned to the refrigeration unit 112.

The airflow supply system 115 includes a plurality of valves 140 that are configured to control the airflow through the supply ducts 116. The airflow return system 113 includes a plurality of return valves 142 that are configured to control the airflow through the return ducts 114. The valves 140, 142 may be implemented as any type of valve that is capable of regulating airflow through a system. In an exemplary embodiment, the valves 140, 142 are implemented as electrically actuated valves that may be controlled by a controller 144 of the valve control system 118. For example, valve control actuators 146 are operably coupled to corresponding valves 140 and valve control actuators 148 are operably coupled to corresponding valves 142. The valves 140, 142 are operable in either a fully open configuration, a fully closed position, or any operational position between fully open and fully closed.

In an exemplary embodiment, the refrigeration system 100 includes one valve 140 for each galley cart 108. For example, in the illustrated embodiment, the refrigeration system 100 includes five galley carts 108 and five corresponding valves 140 associated with each respective galley cart 108; however, the refrigeration system 100 may include any number of galley carts 108 and valves 140 in alternative embodiments. The valve 140 is operated to enable cooled air to be supplied either to the cart compartment 102 surrounding the respective galley cart 108 in an air-over cooling arrangement or directly to the galley cart 108 in an air-through cooling arrangement. In an exemplary embodiment, the valve control system 118 includes one return valve 142 for each galley cart 108; however, any number of return valves 142 may be provided in the valve control system 118. Using multiple valves 140 and multiple return valves 142 enables the valve control system 118 to provide regulation of the quantity of cooling air being supplied to the galley carts 108.

The refrigeration system 100 further includes a plurality of sensors 150 that are configured to provide information to the controller 144 to enable the controller 144 to regulate the temperature of the cart compartments 102 and/or the galley carts 108. For example, the controller 144 may be operably coupled to the valve control actuators 146 and/or the valve control actuators 148 to control the airflow through the refrigeration system 100. In various embodiments, the sensors 150 may include for example, temperature sensors to provide real-time feedback to the controller 144 to enable the controller 144 to adjust or modify the operational temperature for each respective galley cart 108. In various embodiments, the sensors 150 may include for example, a plurality of compartment temperature sensors in each respective cart compartment 102 to sense the temperature within each cart compartment 102. The sensors 150 may include for example, a plurality of airflow supply temperature sensors within or proximate to each supply duct 116, such as at or near the supply port 136 to sense the temperature of the cooling air being supplied. The sensors 150 may include for example, a plurality of airflow return temperature sensors within or proximate to each return duct 114 to sense the temperature of the spent or warmed cooling air. The sensors 150 may include for example, a plurality of airflow inlet pressure sensors, such as flowmeters, within or proximate to each supply duct 116 to sense the pressure or volume of the cooling air being supplied. The sensors 150 may include for example, a plurality of airflow return pressure sensors within or proximate to each return duct 114. The sensors 150 may include for example, a noise sensor installed proximate to the refrigeration unit 112 to sense the noise level, for example on a decibel scale, of the refrigeration unit 112, such as to reduce the operational speed of a compressor on the refrigeration unit 112 and/or the reduce the operational speed of the fan blowing air through the supply duct 116, among other operational functions.

In operation, the outputs from the above described sensors 150 are input to the controller 144. In one embodiment, the controller 144 utilizes the inputs from the sensors 150 to facilitate maintaining the temperature within the cart compartments 102 and/or the galley carts 108 based on a predetermined temperature. In various embodiments, the controller 144 is mounted to the galley 104, such as near the counter 105 or proximate to the refrigeration unit 112 to enable an operator to provide inputs to the controller 144. The controller 144 may be embodied as a computer. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

In various embodiments, the controller 144 is operable to maintain the desired temperatures within each cart compartment 102 or within each galley cart 108. Accordingly, the controller 144 is configured to receive inputs from the sensors 150 described above, receive inputs from the operator, and/or receive inputs from the refrigeration unit 112, the fan, and the galley carts 108. More specifically, the controller 144 may receive an input by the operator to maintain the contents in one of the cart compartments 102 and/or the galley cart 108 at a first predetermined temperature, and maintain the contents of a different cart compartment 102 and/or galley cart 108 at a second predetermined temperature that is different than the first predetermined temperature. In various embodiments, the contents may be embodied as food, beverages, and/or air. More specifically, when the contents are embodied as air, the cart compartment 102 or the galley cart 108 is considered to be empty and thus the cooling air being supplied to the empty cart compartment 102 or galley cart 108 may be reduced or shut off to enable additional cooling air to be supplied to the non-empty galley carts 108. In response, the controller 144 may evaluate the various sensor inputs and adjust the refrigeration unit 112, the fan, or various other components to maintain the galley carts 108 at the desired temperatures.

It should be noted that the various embodiments or portions thereof, such as the controller 144 may be implemented in hardware, software or a combination thereof. The various embodiments and/or components, for example, the controller 144 may be implemented as part of one or more computers or processors. The controller 144 may include a plurality of ports to enable displays, input devices, or other user interfaces to connect to the controller 144. Moreover, the controller 144 may include a radio frequency (RF) receiver/transmitter to enable information, such as an input from a galley cart 108, to be transmitted from and/or transmitted to the controller 144. The controller 144 may include Random Access Memory (RAM) and Read Only Memory (ROM). The controller 144 may further include a storage device, which may be a hard disk drive or a removable storage drive such as a solid state drive, optical disk drive, and the like. The storage device may also be other similar means for loading computer programs or other instructions into the controller 144. In various other embodiments, the controller 144 may be configured to receive inputs via the Internet using for example, a Wi-Fi connection or a hard-wired connection. Additionally, the controller 144 may be configured to couple to a local area network (LAN) and receive inputs from various devices either installed on the aircraft or located remotely form the aircraft. In further embodiments, the controller 144 may receive inputs from a cellular phone device or any other portable touchscreen device, such as a portable laptop computer, etc.

The controller 144 executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
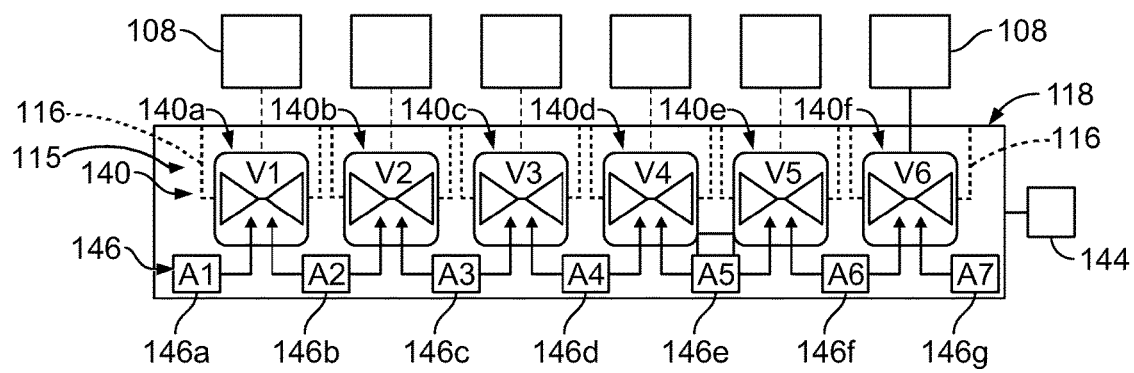
FIG. 4 is a schematic illustration of a portion of the refrigeration system 100 in accordance with an exemplary embodiment.

FIG. 4 is a schematic illustration of a portion of the refrigeration system 100 in accordance with an exemplary embodiment showing the airflow supply system 115 including the supply ducts 116 the valves 140 and the valve control actuators 146 for controlling the airflow in the supply ducts 116 to the supply port 136 for cooling the galley carts 108. In an exemplary embodiment, each valve 140 has a corresponding valve control actuator 146. During a first mode of operation, such as a normal mode of operation, the valve control actuator 146 functions as a primary valve control actuator. In an exemplary embodiment, each valve 140 has a backup valve control actuator 146 operably coupled to the valve 140 for repositioning the valve 140 during a second mode of operation, such as a fault mode of operation when a fault is detected in operation of one or more of the valve control actuators 146 or valves 140. The backup valve control actuator 146 is operated in the second mode of operation to at least partially open the respective valve(s) 140 to ensure that some cooling airflow is able to flow through the supply port 136 to the corresponding galley cart 108 when the fault is detected. The backup valve control actuator(s) 146 operates as a fail-safe measure for the airflow supply system 115.

In the illustrated embodiment, the plurality of valves 140 includes a first valve 140a, a second valve 140b, a third valve 140c, a fourth valve 140d, a fifth valve 140e, and a sixth valve 140f; however, any number of valves 140 may be provided in alternative embodiments. In the illustrated embodiment, the refrigeration system 100 includes a first valve control actuator 146a, a second valve control actuator 146b, a third valve control actuator 146c, a fourth valve control actuator 146d, a fifth valve control actuator 146e, a sixth valve control actuator 146f, and a seventh valve control actuator 146g; however, any number of valve control actuators 146 may be provided in alternative embodiments depending on the number of valves 140 provided. In an exemplary embodiment, the refrigeration system 100 includes one extra valve control actuator 146 compared to the number of valves 140 (for example, N valves 140 and N+1 valve control actuators 146) to enable operational redundancy for all of the valves 140 in the refrigeration system 100. If any of the valve control actuators 146 should fail, the refrigeration system 100 includes a backup valve control actuator, but the refrigeration system 100 does not incur the expense of having two valve control actuators 146 for each valve 140, which would greatly increase the cost of the refrigeration system 100, the energy needed to operate the refrigeration system 100, the weight of the components of the refrigeration system 100, and other negative drawbacks. In various embodiments, the backup valve control actuator 146 may be operably coupled to each of the valves 140. In alternative embodiments, the backup valve control actuator 146 is only coupled to one of the valves 140 and the valve control system 118 is operated to change the operation status of other valve control actuators 146 to become backup valve control actuators, as described in further detail below.

In the illustrated embodiment, the first valve control actuator 146a is operably coupled to the first valve 140a and operates as a primary valve control actuator 146a for the first valve 140a. The first valve control actuator 146a controls operation of the first valve 140a in the first mode of operation. For example, the first valve control actuator 146a is operated to open (for example, partially or fully) the first valve 140a when the valve control system 118 is operating in the first mode of operation.

In the illustrated embodiment, the second valve control actuator 146b is operably coupled to the second valve 140b and operates as a primary valve control actuator 146b for the second valve 140b. The second valve control actuator 146b controls operation of the second valve 140b in the first mode of operation. For example, the second valve control actuator 146b is operated to open (for example, partially or fully) the second valve 140b when the valve control system 118 is operating in the first mode of operation.

In the illustrated embodiment, the third valve control actuator 146c is operably coupled to the third valve 140c and operates as a primary valve control actuator 146c for the third valve 140c. The third valve control actuator 146c controls operation of the third valve 140c in the first mode of operation. For example, the third valve control actuator 146c is operated to open (for example, partially or fully) the third valve 140c when the valve control system 118 is operating in the first mode of operation.

In the illustrated embodiment, the fourth valve control actuator 146d is operably coupled to the fourth valve 140d and operates as a primary valve control actuator 146d for the fourth valve 140d. The fourth valve control actuator 146d controls operation of the fourth valve 140d in the first mode of operation. For example, the fourth valve control actuator 146d is operated to open (for example, partially or fully) the fourth valve 140d when the valve control system 118 is operating in the first mode of operation.

In the illustrated embodiment, the fifth valve control actuator 146e is operably coupled to the fifth valve 140e and operates as a primary valve control actuator 146e for the fifth valve 140e. The fifth valve control actuator 146e controls operation of the fifth valve 140e in the first mode of operation. For example, the fifth valve control actuator 146e is operated to open (for example, partially or fully) the fifth valve 140e when the valve control system 118 is operating in the first mode of operation.

In the illustrated embodiment, the sixth valve control actuator 146f is operably coupled to the sixth valve 140f and operates as a primary valve control actuator 146f for the sixth valve 140f The sixth valve control actuator 146f controls operation of the sixth valve 140f in the first mode of operation. For example, the sixth valve control actuator 146f is operated to open (for example, partially or fully) the sixth valve 140f when the valve control system 118 is operating in the first mode of operation.

In an exemplary embodiment, the second valve control actuator 146b is a bi-directional actuator. As used herein, a bi-directional actuator is an actuator coupled to two different valves 140 configured to operate on one of the valves 140 when operated in a first mode of operation and configured to operate on the other of the valves 140 when operated in a second mode of operation. A bi-directional actuator defines a primary valve control actuator for one of the valves 140 and a backup valve control actuator for the other of the valves 140. As such, a single actuator operates on two different valves depending on the mode of operation. In an exemplary embodiment, the bi-directional actuator is a bi-directional linear solenoid having two armatures movable in two different directions, such as and two opposing directions; however, other types of bi-directional actuators may be used in alternative embodiments. In an exemplary embodiment, the second valve control actuator 146b is a multiple valve control actuator. As used herein, a multiple valve control actuator is an actuator coupled to multiple different valves and configured to operate the multiple valves 140 to open and/or close the corresponding valves 140. The bidirectional actuator is one type of multiple valve control actuator; however, the multiple valve control actuator may be coupled to more than two different valves 140. For example, the multiple valve control actuator may be coupled to all of the valves 140 in various embodiments, such as through linkages or other mechanical connection means.

The second valve control actuator 146b is operably coupled to the first valve 140a and operates as a backup valve control actuator 146b for the first valve 140a. The second valve control actuator 146b controls operation of the first valve 140a in the second mode of operation. For example, the second valve control actuator 146b is operated to open (for example, partially or fully) the first valve 140a when the valve control system 118 is operating in the second mode of operation, such as during a failed or fault detected condition.

In an exemplary embodiment, the third valve control actuator 146c is a multiple valve control actuator. For example, in the illustrated embodiment, the third valve control actuator 146c is a bi-directional actuator. The third valve control actuator 146c is operably coupled to the second valve 140b and operates as a backup valve control actuator 146c for the second valve 140b. The third valve control actuator 146c controls operation of the second valve 140b in the second mode of operation. For example, the third valve control actuator 146c is operated to open (for example, partially or fully) the second valve 140b when the valve control system 118 is operating in the second mode of operation, such as during a failed or fault detected condition.

In an exemplary embodiment, the fourth valve control actuator 146d is a multiple valve control actuator. For example, in the illustrated embodiment, the third valve control actuator 146c is a bi-directional actuator. The fourth valve control actuator 146d is operably coupled to the third valve 140c and operates as a backup valve control actuator 146d for the third valve 140c. The fourth valve control actuator 146d controls operation of the third valve 140c in the second mode of operation. For example, the fourth valve control actuator 146d is operated to open (for example, partially or fully) the third valve 140c when the valve control system 118 is operating in the second mode of operation, such as during a failed or fault detected condition.

In an exemplary embodiment, the fifth valve control actuator 146e is a multiple valve control actuator. For example, in the illustrated embodiment, the third valve control actuator 146c is a bi-directional actuator. The fifth valve control actuator 146e is operably coupled to the fourth valve 140d and operates as a backup valve control actuator 146e for the fourth valve 140d. The fifth valve control actuator 146e controls operation of the fourth valve 140d in the second mode of operation. For example, the fifth valve control actuator 146e is operated to open (for example, partially or fully) the fourth valve 140d when the valve control system 118 is operating in the second mode of operation, such as during a failed or fault detected condition.

In an exemplary embodiment, the sixth valve control actuator 146f is a multiple valve control actuator. For example, in the illustrated embodiment, the third valve control actuator 146c is a bi-directional actuator. The sixth valve control actuator 146f is operably coupled to the fifth valve 140e and operates as a backup valve control actuator 146f for the fifth valve 140e. The sixth valve control actuator 146f controls operation of the fifth valve 140e in the second mode of operation. For example, the sixth valve control actuator 146f is operated to open (for example, partially or fully) the fifth valve 140e when the valve control system 118 is operating in the second mode of operation, such as during a failed or fault detected condition.

In an exemplary embodiment, the seventh valve control actuator 146g is a single directional actuator. As used herein, a single valve control actuator is an actuator coupled to only a single one of the valves 140 and configured to operate the single valve 140 in one mode of operation. The single valve control actuator may be a single direction linear actuator having an armature movable in a single direction. The seventh valve control actuator 146g is operably coupled to the sixth valve 140f and operates as a backup valve control actuator for the sixth valve 140f. The seventh valve control actuator 146g controls operation of the sixth valve 140f in the second mode of operation. For example, the seventh valve control actuator 146g is operated to open (for example, partially or fully) the sixth valve 140f when the valve control system 118 is operating in the second mode of operation, such as during a failed or fault detected condition. In various embodiments, the seventh valve control actuator 146g only operates in the second mode of operation and is inoperable during the first mode of operation. For example, the seventh valve control actuator 146g is nonoperational on the sixth valve 140f during the first second mode of operation.

In an exemplary embodiment, the first valve control actuator 146a is a single valve control actuator and is only operably coupled to the first valve 140a. The first valve control actuator 146a only operates in the first mode of operation and is inoperable during the second mode of operation. For example, the first valve control actuator 146a is nonoperational on the first valve 140a during the second mode of operation The refrigeration system 100 provides redundancy in the valve control system 118 to provide backup control for the valves 140 should one of the valve control actuators 146 fail to open the respective valve 140 for cooling the galley cart 108. For example, the refrigeration system 100 includes a plurality of primary valve control actuators 146 and at least one backup valve control actuator 146. In an exemplary embodiment, at least one of the valve control actuators 146 is operable as both a primary valve control actuator for one of the valves 140 and a backup valve control actuator for a different one of the valves 140. For example, when the mode of operation of the valve control system 118 changes the primary valve control actuator may switch functionality to a backup valve control actuator and open a different one of the valves 140. In an exemplary embodiment, each of the valves 140 is operably connected to one primary valve control actuator and one backup valve control actuator. For example, the third valve 140c is operably coupled to the third valve control actuator 146c as the primary valve control actuator and is operably coupled to the fourth valve control actuator 146d as the backup valve control actuator. In normal operation, the third valve control actuator 146c controls operation of the third valve 140c, but when a fault is detected in any of the valve control actuators 146, the valve control system 118 may switch to a fault mode. In the fault or second mode of operation, the fourth valve control actuator 146d controls operation of the third valve 140c. In an exemplary embodiment, and the second mode of operation, the third valve control actuator 146c controls operation of the second valve 140b as a backup valve control actuator for the second valve 140b. Similarly, in the first mode of operation, the fourth valve control actuator 146d does not operate as the backup valve control actuator, but rather defines the primary valve control actuator for the fourth valve 140d.

In the illustrated embodiment, six valves 140 are shown and six of the valve control actuators 146 define primary valve control actuators. However, the refrigeration system 100 includes a seventh valve control actuator that, in the first mode of operation, is a backup valve control actuator. Each of the plurality of primary valve control actuators 146 is used to operably reposition one of the respective valves 140 in the first mode of operation. Some or all of the primary valve control actuators 146 are used to operably reposition a different valve in the second mode of operation. In various embodiments, the primary valve control actuators 146 are operable to move the respective valves 140 in a first direction while the bypass valve control actuators 146 are operable to move the respective valves 140 in a second direction, which may be different than the first direction, such as an opposite direction. For example, in various embodiments, the valve 140 may be a butterfly valve. The primary valve control actuator may rotate the butterfly valve in a first direction (for example, clockwise) while the backup valve control actuator may rotate the butterfly valve in a second direction (for example, counterclockwise). For example, the butterfly valve may be closed at a first operational position 0°, the primary valve control actuator may rotate the butterfly valve to a second operational position, such as at 90°, and the backup valve control actuator may rotate the butterfly valve to a third operational position, such as at −90°. The butterfly valve may include one or more springs to close the butterfly valve, whereas the valve control actuators 146 in part of force on the valve to overcome the spring force and move the valve.

In an exemplary embodiment, the valve control actuators 146 are in control communication with the controller 144 and are electrically controlled. The controller 144 is configured to identify fault conditions in the valve control actuators 146 and automatically change the mode of operation from the first or normal mode of operation to the second or fault mode of operation to activate the backup valve control actuator(s). During actuation in the first mode of operation or in the second mode of operation, the valve control actuators 146 may be linearly actuated. Alternatively, the valve control actuators 146 may be rotatably actuated. The valve control actuators 146 may be connected to the valves by mechanical linkages, such as rods, links, gears, springs, and the like. In other various embodiments, the valve control actuators 146 may be operably connected to the valves 140 by other means, such as being hydraulically coupled, pneumatically coupled, and the like.

During operation, the controller 144 monitors the operation of the valve control actuators 146. For example, the controller 144 monitors electronic signal of the valve control actuators 146. The controller 144 is able to detect a fault of one or more of the valve control actuators 146, such as when there is a spike in the electronic signal or a dip in the electronic signal. For example, when one of the valves 140 or the valve control actuators 146 are jammed or not functioning properly the controller 144 may receive a signal relating to such faulty operation and automatically enter the second mode of operation. Optionally, the controller 144 may send a signal to each of the valve control actuators 146 to return to a default position prior to entering the second mode of operation. In an exemplary embodiment, when the valve control system 118 enters the second mode of operation, the controller 144 changes the associated valve 140 with the valve control actuators 146. For example, while the third valve control actuator 146c is normally associated with the third valve 140c in the first mode of operation, the controller 144 changes the association of the third valve control actuator 146c to the second valve 140b causing the third valve control actuator 146c to reposition the second valve 140b.

Figure 5:
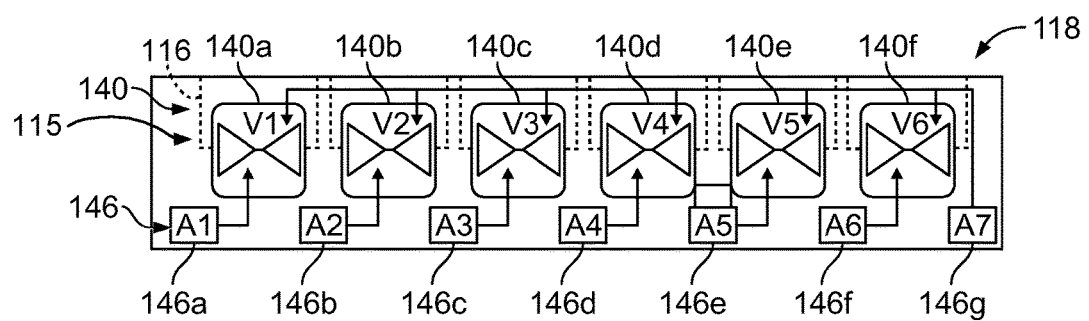
FIG. 5 is a schematic illustration of a portion of the refrigeration system 100 in accordance with an exemplary embodiment.

FIG. 5 is a schematic illustration of a portion of the refrigeration system 100 in accordance with an exemplary embodiment showing the airflow supply system 115 including the supply ducts 116 the valves 140 and the valve control actuators 146 for controlling the airflow in the supply ducts 116 to the supply port 136 for cooling the galley carts 108. The refrigeration system 100 shown in FIG. 5 is similar to the refrigeration system 100 shown in FIG. 4; however, the seventh valve control actuator 146g is operably coupled to each of the valves 140. The seventh valve control actuator 146g defines a backup valve control actuator 146g for backing up each of the other primary valve control actuators. In the first mode of operation, the seventh valve control actuator 146g is not operated to control any of the valves 140. However, when the controller 144 detects a fault and switches to the second mode of operation, the controller 144 operates the seventh valve control actuator 146g to open all of the valves 140. The individual control of airflow to the galley carts 108 is lost in the second mode of operation in the arrangement shown in FIG. 5; however, cooling airflow is guaranteed to flow to each of the cart compartment 102 and/or the galley carts 108 ensure that cooling airflow is received at such galley carts 108 until the faulty solenoid can be repaired or replaced.

In the illustrated embodiment, each of the first-sixth valve control actuators 146a-146f define single valve control actuators and are each operably coupled to a single one of the valves 140. Each of the first-sixth valve control actuators 146a-146f are primary valve control actuators for repositioning the respective valves 140a-140f when the valve control system 118 is operating in the first mode of operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A refrigeration system having an airflow supply system having a supply duct providing cooled air from a refrigeration unit to a plurality of galley carts received in one or more cart compartments, the refrigeration system comprising:
   a plurality of valves coupled in the airflow supply system for controlling flows of the cooled air to the plurality of galley carts in the one or more cart compartments, each valve of the plurality of valves associated with a respective galley cart;
   a plurality of primary valve control actuators, each of the primary valve control actuators coupled to a respective valve and configured to reposition the respective valve during a first mode of operation; and
   a backup valve control actuator coupled to at least one of the plurality of valves and configured to reposition the at least one of the plurality of valves during a second mode of operation.

2. The cooling system of claim 1, wherein at least one of the primary valve control actuators define the backup valve control actuator for a different one of the plurality of valves.

3. The cooling system of claim 1, wherein the backup valve control actuator defines a primary valve control actuator for a different one of the plurality of valves.

4. The cooling system of claim 1, wherein the plurality of valves comprise N valves and the plurality of primary valve control actuators comprise N primary valve control actuators, the backup valve control actuator comprising a single backup valve control actuator.

5. The cooling system of claim 1, wherein a portion of the plurality of primary valve control actuators are each operably coupled to a respective two of the valves, each of such portion of the plurality of primary valve control actuators operably repositioning one of the respective two valves in the first mode of operation and operably repositioning the other of the respective two valves in the second mode of operation.

6. The cooling system of claim 1, wherein a portion of the plurality of primary valve control actuators comprise single direction solenoids and a portion of the plurality of primary valve control actuators comprise bi-direction solenoids.

7. The cooling system of claim 1, wherein one of the valves comprises a first valve, one of the plurality of primary valve control actuators comprise a first primary valve control actuator coupled to the first valve and configured to move the first valve to a first operational position, the backup valve control actuator being coupled to the first valve and configured to move the first valve to a second operational position.

8. The cooling system of claim 1, wherein one of the valves comprises a first valve and another of the valves comprises a second valve, one of the plurality of primary valve control actuators comprises a first primary valve control actuator coupled to the first valve, the first primary valve control actuator being a single direction solenoid configured to move the first valve to a first operational position, the backup valve control actuator being coupled to the first valve, the backup valve control solenoid being a bi-direction solenoid configured to move the first valve to a second operational position and configured to move the second valve to a first operational position.

9. The cooling system of claim 1, further comprising a controller in control communication with the plurality of primary valve control actuators and the backup valve control actuator, the controller being configured to identify fault conditions in the plurality of primary valve control actuators and automatically change the mode of operation from the first mode of operation to the second mode of operation to activate the backup valve control actuator.

10. The cooling system of claim 1, wherein each of the valves is coupled to and configured to be operated by two valve control actuators selected from the group of the plurality of primary valve control actuators and the backup valve control actuator.

11. The cooling system of claim 1, wherein the backup valve control actuator is operably coupled to each of the valves to reposition each of the valves in the second mode of operation.

12. The cooling system of claim 1, further comprising mechanical linkages between each of the primary valve control actuators and the corresponding valves and the backup valve control actuator and the corresponding at least one of the plurality of valves.

13. A refrigeration system having an airflow supply system having a supply duct providing cooled air from a refrigeration unit to a plurality of galley carts received in one or more cart compartments, the refrigeration system comprising:
a plurality of valves coupled in the airflow supply system for controlling flows of the cooled air to the plurality of galley carts in the one or more cart compartments, each valve of the plurality of valves associated with a respective galley cart;
a first single valve control actuator coupled to a single respective valve and configured to reposition the respective valve during a first mode of operation and configured to be nonoperational on the respective valve during a second mode of operation;
a second single valve control actuator coupled to a single respective valve different from the valve associated with the first single valve control actuator and configured to reposition the respective valve during the second mode of operation and configured to be nonoperational on the respective valve during the first mode of operation; and
a first multiple valve control actuator coupled to at least two of the plurality of valves, the first multiple valve control actuator repositions a first valve of the at least two of the plurality of valves during the first mode of operation, the first multiple valve control actuator repositions a second valve of the at least two of the plurality of valves during the second mode of operation.

14. The cooling system of claim 13, wherein the first multiple valve control solenoid is operably coupled to the same valve operably coupled to the first single valve control solenoid.

15. The cooling system of claim 14, wherein the first multiple valve control actuator is operably coupled to the same valve operably coupled to the second single valve control actuator.

16. The cooling system of claim 13, further comprising at least one additional multiple valve control actuator, the plurality of valves comprising N valves, the group comprising the first single valve control actuator, the second single valve control actuator, the first multiple valve control actuator and the at least one additional multi-valve control actuator comprising N+1 valve control actuators.

17. The cooling system of claim 13, further comprising a controller in control communication with the first single valve control actuator, the second single valve control actuator and the first multiple valve control actuator, the controller being configured to identify fault conditions in any of the first single valve control actuator, the second single valve control actuator and the first multiple valve control actuator and automatically change the mode of operation from the first mode of operation to the second mode of operation.

18. The cooling system of claim 13, wherein the second single valve control actuator is operably coupled to the first valve during the second mode of operation.

19. The cooling system of claim 13, wherein the first single valve control actuator comprises a single direction solenoid, the second single valve control actuator comprises a single direction solenoid, the first multiple valve control actuator comprises a bi-direction solenoid.

20. A refrigeration system having an airflow supply system having a supply duct providing cooled air from a refrigeration unit to a plurality of galley carts received in one or more cart compartments, the refrigeration system comprising:
a first valve coupled in the airflow supply system for controlling flow of the cooled air to a first galley cart of the plurality of galley carts;
a second valve coupled in the airflow supply system for controlling flow of the cooled air to a second galley cart of the plurality of galley carts; and
a valve control system for controlling positions of the first valve and the second valve, the valve control system operable in a first mode of operation and a second mode of operation, the valve control system comprising:
a first valve control actuator operably coupled to the valve control system, the first valve control actuator coupled to the first valve and configured to reposition the first valve in the first mode of operation;
a second valve control actuator operably coupled to the valve control system, the second valve control actuator coupled to the second valve and configured to reposition the second valve in the first mode of operation, the second valve control actuator coupled to the first valve and configured to reposition the first valve in the second mode of operation; and
a third valve control actuator operably coupled to the valve control system, the third valve control actuator coupled to the second valve and configured to reposition the second valve in the second mode of operation.

21. The refrigeration system of claim 20, further comprising a third valve coupled in the airflow supply system for controlling flow of the cooled air to a third galley cart of the plurality of galley carts, the third valve control actuator coupled to the third valve and configured to reposition the third valve in the first mode of operation.

22. The refrigeration system of claim 20, wherein the valve control system further comprises a fourth valve control actuator operably coupled to the valve control system, the fourth valve control actuator coupled to the third valve and configured to reposition the third valve in the second mode of operation.

* * * * *